April 27, 1965 — R. K. ULM — 3,180,619
VEHICLE LIFTING JACKS
Filed Dec. 1, 1961 — 3 Sheets-Sheet 1
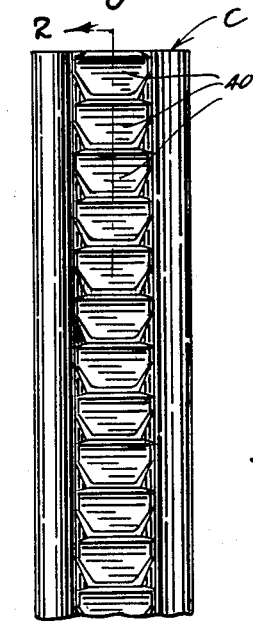
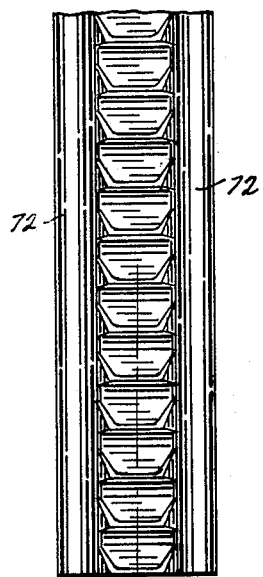
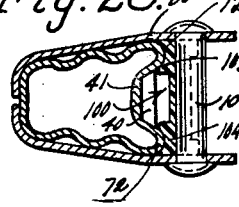
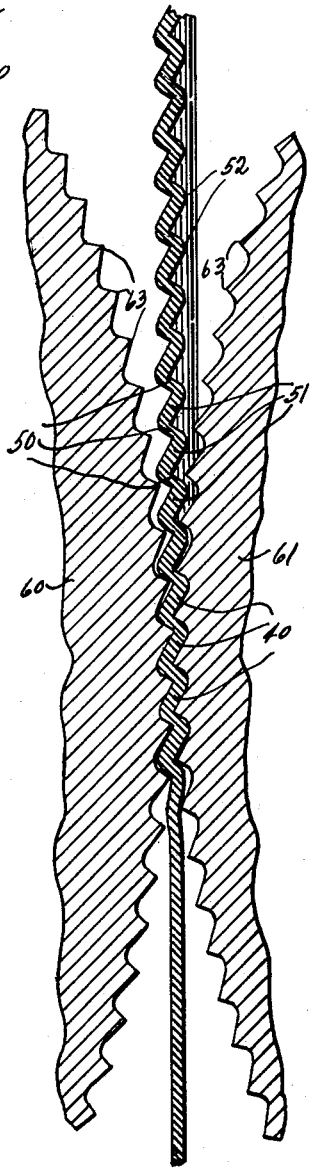
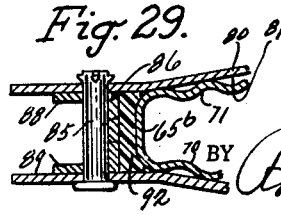
INVENTOR
RUSSELL K. ULM
ATTORNEYS

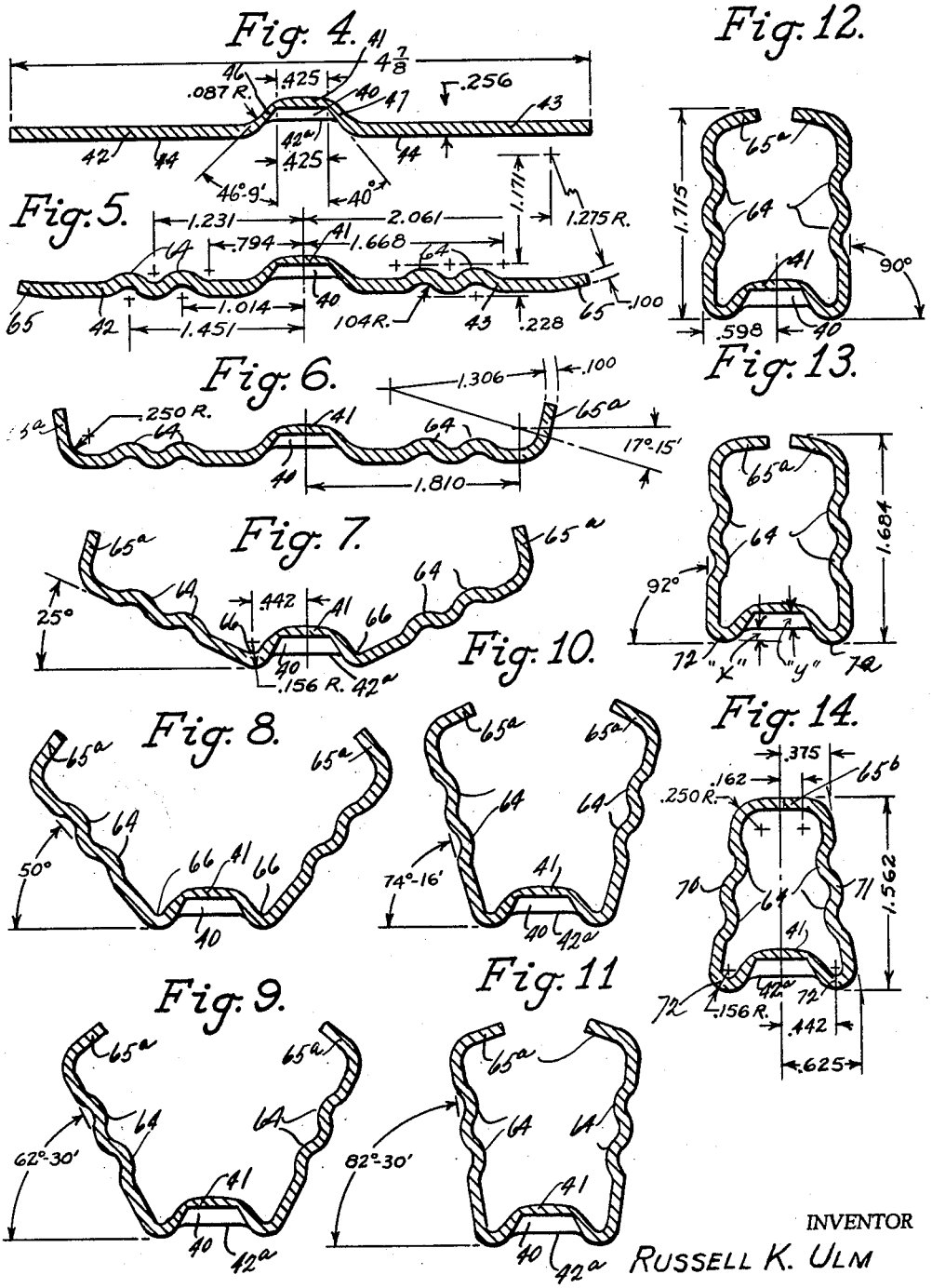

April 27, 1965 R. K. ULM 3,180,619
VEHICLE LIFTING JACKS
Filed Dec. 1, 1961 3 Sheets-Sheet 3
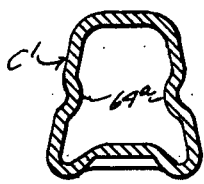
Fig. 15.
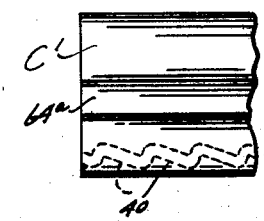
Fig. 16.
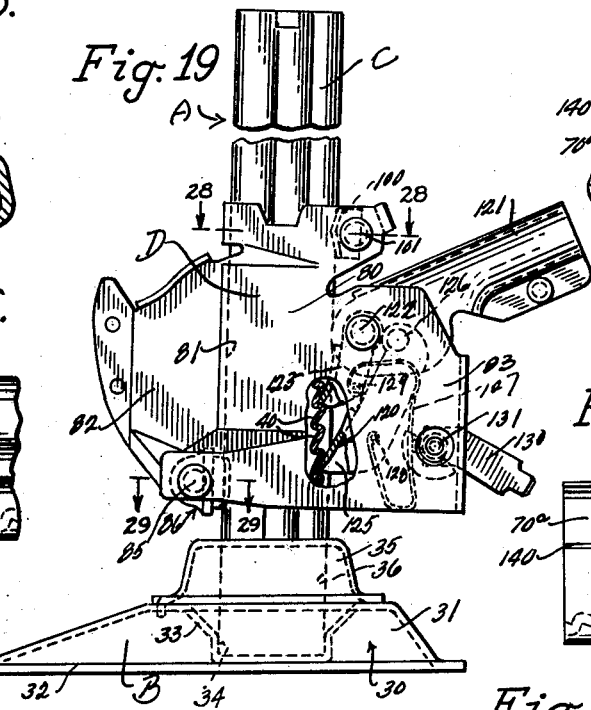
INVENTOR
RUSSELL K. ULM
BY
ATTORNEYS United States Patent Office 3,180,619
Patented Apr. 27, 1965

3,180,619
VEHICLE LIFTING JACKS
Russell Keith Ulm, Butler, Ind., assignor to Universal Tool & Stamping Company, Inc., Butler, Ind., a corporation of Indiana
Filed Dec. 1, 1961, Ser. No. 156,398
6 Claims. (Cl. 254—110)

This invention relates to improvements in vehicle lifting jacks.

The primary object of this invention is the provision of an improved lifting jack having a rack bar which is very durably constructed for supporting heavy vehicles against liability of bending or collapse, and which is provided with an improved arrangement of rack teeth best adapted to cooperate with the pawl mechanism of the lifting jack to insure quick and accurate movement of the lifting casing and housing.

A further object of the invention is the provision of improved anti-friction means for lifting jacks such as will enable the lifting casing or housing for the pawl mechanism to slide easily and readily against liability of binding or loose motion along the rack bar of the jack.

Other objects and advantages of this invention will be apparent during the course of the following detailed description.

In the accompanying drawings, forming a part of this specification, and wherein similar reference characters designate corresponding parts throughout the several views:

FIGURE 1 is a fragmentary front elevation of the improved rack bar for lifting jacks.

FIGURE 2 is a fragmentary longitudinal cross sectional view taken substantially on the line 2—2 of FIGURE 1.

FIGURE 3 is a diagrammatic view showing how the teeth of the improved rack bar are formed in a wall of the tubular rack bar, and more particularly showing tooth-forming rolls and the manner in which they cooperate to form the improved tooth arrangement of the rack bar.

FIGURES 4 to 14 inclusive successively show the progressive steps in manipulating cold flat strip steel stock and shaping it into the improved tubular rack bar.

FIGURE 15 is a cross sectional view taken through a modified form of rack bar.

FIGURE 16 is a fragmentary side elevation of the bar of FIGURE 15.

FIGURE 17 is a cross sectional view taken through another form of rack bar.

FIGURE 18 is a side elevation of the form of rack bar shown in FIGURE 17.

FIGURE 19 is a fragmentary side elevation of the improved jack structure, partly in section, showing the pawl mechanism and improved anti-friction means for supporting the lift housing for easy movement along the rack bar.

FIGURE 20 is a plan view of the jack structure shown in FIGURE 19.

FIGURE 21 is a side elevation of an anti-friction slide member adapted to be supported by the lift housing or casing for engagement along the front wall of the rack bar to facilitate easy movement of the lift casing along the rack bar.

FIGURE 22 is a cross sectional view taken through the anti-friction member of FIGURE 21 substantially on the line 22—22 of FIGURE 23.

FIGURE 23 is a plan view of the anti-friction slide member of FIGURE 21.

FIGURE 24 is a rear elevation of an anti-friction slide member adapted to be supported by the lift housing of the jack for operation along the rear tooth wall of the jack bar structure.

FIGURE 25 is a plan view of the anti-friction member of FIGURE 24.

FIGURE 26 is an end view of the anti-friction member of FIGURE 25.

FIGURE 27 is a front elevation of the anti-friction member of FIGURE 24.

FIGURES 28 and 29 are fragmentary cross sectional views taken substantially on the lines 28—28 and 29—29 of FIGURE 19, and more particularly showing the rear and front anti-friction members of the lift housing adapted to engage the rack bar to facilitate easy movement of the pawl supported lift housing therealong.

In the drawings, wherein for the purpose of illustration is shown a preferred embodiment of the jack and modified forms of the rack bar, the letter A may generally designate the jack assemblage which includes a base B, improved rack bar C, and lifting assemblage D.

The base construction B is known in the art, and includes a stamped metal inverted cup-shaped main portion 30 having a body 31 and foot flanges 32 surrounding the same. A downwardly depending socket portion 33 is formed integral with the portion 31. It has a rack bar receiving socket 34 in the lower portion thereof. Spot welded to the upper wall of the portion 31 is a dome 35 provided with an opening 36 therethrough for receiving the lower end of rack bar C.

The rack bar C forming the subject matter of divisional applications Serial No. 223,970, filed September 17, 1962, and Serial No. 224,049, filed September 17, 1962, is formed in a continuous production tube mill out of cold flat strip or ribbon steel stock. The forming rolls operate to first produce the teeth in the stock plate, as shown in FIG. 3, and through successive passes the plate is formed by bending operations to produce a bar of tubular formation, polygonal or trapezoidal in cross section, as shown in FIG. 14.

In the sequence of passes the cold flat strip of steel stock enters the mill and a longitudinal series of teeth 40 are rolled centrally thereof; the rear wall 41 thus being depressed from the plane of the laterally extending flange portions 42 and 43. For standard sized jacks the dimensions of the teeth and the formation thereof are designated in FIG. 4 wherein it is shown that the rear edges 42ª of each tooth lies appreciably inwardly of the rear surfaces 44 of the side flanges 42 and 43. The sides 46 and 47 are sloped relatively inward towards the rear wall 41 in convergent relation from their curved connections with the flanges 42 and 43. Some of the material from the ribbon of steel is used in forming the indented teeth and that is the reason the wall 41 and side convergent portions 46 and 47 are thinner than the flanges 42 and 43. Referring further to formation of the teeth as shown in FIG. 2 and FIG. 3, the lower pawl engaging portion 50 of each tooth slopes off horizontally downwardly to the rear, and joins with a lower tooth portion 51 which is longer than the portion 50 and which slopes downwardly and to the front; the lower end thereof being connected to the front end of the upper portion 50 of the next lowermost tooth 40. The front wall surface of the tooth portion 51 lies in a plane 30° off vertical and the planes of the outer surfaces of the upper portion 50 and the lower portion 51 of each tooth lie at 90° with respect to each other. The apex of the tooth designated at 52 is convexly curved and from such apex to apex, adjacent teeth extend approximately ⅜ of an inch. These dimensions may vary somewhat according to the size of rack bar needed. The juncture of the upper face of the tooth portion 50 and the rear face of the portion 51 forms a right angled chisel edge, since the pawls of the jack mechanism are intended to engage in the recess made by the tooth portions 50 and 51, at this juncture.

It will be noted from FIG. 3 how the bar teeth are rolled; the rolls 60 and 61 being shaped to provide the necessary above described tooth formation, and particularly the chisel edge 63 formed at the juncture of the outer surfaces of the tooth portions 50 and 51.

In the second pass of the rolling mill designated at FIG. 5, the steel ribbon flanges 42 and 43 are provided with longitudinally extending ribs 64, a pair being provided in each flange, although this may vary according to the size of the jack bar, and the ends 65 of these flanges 42 and 43 are upturned in the same direction as indentation of the teeth; the convexed sides of the rib 64 extending also in the same direction as indentation of teeth in the plate.

A third operation as shown in FIG. 6 further curls the portions 65 as indicated at 65ᵃ in FIG. 6.

In FIG. 7 the mill starts the closing operations of flanges 42 and 43 by bending the same at 66. In operations shown in FIGS. 8, 9, 10, 11, 12 and 13, side wall portions of the tube are formed by a sequence of passes through the angles designated in the drawings, and finally the ends of the portion 65ᵃ are brought into contact and pass through a welder of the mill where their marginal portions are heated and fused together to provide a front wall 65ᵇ designated in FIG. 14. In this view it is shown that in addition to the rear wall 41 there are now provided side walls 70 and 71. At each side of the tooth formation the rack bar is provided with convexly formed trackways 72 which project outwardly beyond the front edges 42ᵃ of the teeth. These trackways receive an anti-friction means to facilitate sliding of the jack lifting structure along the rack bar.

It will be noted that the distance "X" (FIG. 13) shows that the front edges 42ᵃ of teeth 40 are spaced from the rear edges of trackways 72, and the distance "Y" shows the actual depth of each tooth 40.

Referring now to the lifting assemblage D, the same includes a casing preferably shaped from a single piece of material to provide a central portion 80 having side walls to define a passageway 81 for receiving the bar C; an extension 82 which may appropriately be termed a lifting foot, at the front of the jack, and at the rear of the jack a housing portion 83 for receiving the pawl mechanism. At the lower front corner the casing of the assemblage D has side walls provided with a cross pin 85, shown in FIG. 19 and FIG. 29 adapted to support an anti-friction device 86, detailed in FIGS. 21, 22 and 23, and adapted to operate as an anti-friction piece against the front wall 65ᵇ of the jack bar C. This anti-friction member comprises a metal U-shaped clip 87 having leg portions 88 and 89 and a bight portion 90; the leg portions 88 and 89 being apertured at 90ᵃ to receive the pin 85 upon which the clip swivels. The bight portion 90 is centrally recessed and has a cross bar 91 adapted to support the solid synthetic resin anti-friction member 92. The anti-friction member 92 is provided with projecting portions 93 which fixedly engage in openings in the bight portion 90. Its outer surface is longitudinally grooved at 94 for receiving therein the wall 65ᵇ of rack bar C, as shown in FIG. 29. The outer sides of this anti-friction member 92 are ribbed to extend around the convexly curved edges of the rack bar where the wall 65ᵇ meets the walls 70 and 71.

The synthetic plastic material out of which the member 92 is made is a solid synthetic resin such as nylon or DuPont "Delrin 500" which is an acetal resin known as a polyoxymethylene, the coefficient of hardness of which is adaptable for use an anti-friction slide against metal. It is substantially of the material set forth in U.S. Patent 2,768,994, dated October 30, 1956.

At its upper rear corner the housing structure of the lifting assemblage D supports a synthetic resin anti-friction device 100 which is secured in place between the walls of the rack bar receiving portion 80 of the casing and mounted upon a pin 101 supported by said walls, as shown in FIG. 28. This anti-friction device is shown in detail in FIGS. 24, 25, 26 and 27, and comprises a body portion 102 provided on its front face with raised portions 104 and 105 with concavely curved faces 106 adapted to receive the trackways 72 of the jack bar. The recess 103 between the raised portions 104 and 105 faces the teeth of the rack bar in spaced relation therewith as shown in FIG. 28. The anti-friction member 100 has end rearwardly extending portions 109. These portions together with the body 102 are each provided with a channel 110 adapted to receive the pin 101 in snapped relation thereon, where it is retained thereon due to the fact that the channel 110 has its center spaced forwardly from the outer end edges of the portions 109. The synthetic resin piece 100 may be constructed of the same material as the synthetic resin member 92 above described.

The pawl mechanism 120 of the jack structure is conventional and operates for the most part as set forth in a co-pending application Serial No. 712,375, filed January 31, 1958. It includes a pawl actuating member 121 which is a handle receiving socket, pivoted at 122. A short pawl 123 is pivoted at 122 upon the member 121. It is adapted to act upon the rack teeth 40 of the bar C. Upon the member 121 is also pivoted a longer pawl 125, at 126, also adapted to act against the rack teeth 40. A loop shaped spring 127 is provided in the housing structure for the assemblage D connected at one end at 128 to the lower end of the pawl 125 and connected at its other end at 129 to the lower end of the shorter pawl. The function of this spring is to urge the free ends of the pawls into association with respect to the rack teeth of the bar C. A trip lever 130 is pivoted at 131 on the housing of the jack for engagement with the bight portion of the spring 127. When in the position shown in FIG. 19 the spring induces a compressive force large enough to overcome both the tensile and compressive forces introduced in the spring by the alternate up and downward movement of the long pawl 125. When the trip lever 130 is lifted out of operation the up and downward movement of the handle of the jack and the member 121 will result in the jack descending upon the rack bar C. In operation the short pawl 123 will engage the teeth 40 in the edges 63 and the load will be transferred from the short pawl to the long pawl as the handle is depressed. The jack lifting assemblage moves upwardly when the handle is moved downwardly and when the handle is rotated upwardly the long pawl is pulled upwardly to the next tooth 40 upon the rack bar when the lever 130 is in the position shown in FIG. 19.

As shown in FIGS. 15 and 16, it is proposed to provide a rack bar C' for small sized jacks for use in connection with compact vehicles, which includes all the features above described for the bar C except that this bar C' is provided with a single reinforcing rib 64ᵃ on each side wall thereof.

As shown in FIGS. 17 and 18, a small sized jack bar C" may be provided in which the side walls 70ᵃ and 71ᵃ are angled at 140 instead of being ribbed.

In lieu of the synthetic resin anti-friction slide pieces 92 and 100 rollers may be used at these locations, if found desirable.

It will be noted that when the jack supports a load, the lower front anti-friction slide 86 is forced against the front wall of the bar and at the same time the upper anti-friction device 100 is similarly forced against the rear wall of the bar.

Various changes in the size, shape and arrangement of parts may be made to the form of invention herein shown and described without departing from the spirit of the invention or scope of the claims.

I claim:

1. A jack construction comprising an elongated rack bar having a series of teeth longitudinally therealong, said rack bar teeth being formed along the rear thereof and the rack bar having a casing structure having a passageway therethrough for receiving the rack bar so that the casing structure may be moved longitudinally of the rack bar, a lifting foot extension on said casing for engaging a load for lifting thereof, said rack bar having rearwardly positioned projecting trackways on the same at each side of the teeth, a synthetic resin anti-friction member mounted on said casing having channels therein for slidably receiving the trackways, and pawl means carried by said casing structure for engaging the teeth of the rack bar whereby to move the casing structure along the rack bar.

2. A jack construction as defined in claim 1 in which said casing structure has a synthetic resin anti-friction member connected thereto engaging the front of said bar.

3. In a jack structure the combination of a supporting base, a rack bar mounted on said supporting base of elongated tubular form polygonal in cross section and comprising a rear rack wall, side walls connected therewith and a front wall connected with the side walls in spaced relation with respect to the rear wall, the rear wall having parallel rearward projecting side trackways adjacently connected to the side walls and an intermediate portion forwardly recessed between and connected with the trackways and having a series of teeth arranged lengthwise thereof located in said recess, a load lifting assemblage slidably mounted on the rack bar comprising a housing provided with a passageway for receiving the rack bar for longitudinal sliding therethrough, handle actuated pawl means mounted on said housing for cooperation with the rack teeth in order to lift the loading lifting assemblage along the rack bar, and anti-friction means mounted on said housing in sliding non-tiltable engagement with the side trackways.

4. In a vehicle lifting jack the combination of a supporting base, an elongated rack bar having a series of teeth extending therealong, a lifting assemblage slidably mounted on said bar including a casing provided with side walls engaging at opposite sides of the bar having a front lift extension, said side walls additionally extending forwardly in spaced relation in front of said bar, a cross pin supported on said additional forward extensions in spaced relation from and at the front of said bar, a rigid metal clip pivotally mounted on said pin, a solid synthetic resin anti-friction member mounted on said clip and engaging the front wall of said bar, and a pawl type lifting means carried by said casing walls at the rear of the bar in position to engage the teeth of the bar to raise and lower the casing on said bar.

5. A vehicle lifting jack comprising a base, an elongated rack bar supported in upright relation by said base having a front wall, a rear wall and side walls, the front wall being channeled and having at each side of the channel rearwardly projecting trackways and in the channel inwardly of said trackways having a longitudinal series of teeth thereon, a lifting assemblage slidable on said bar including a casing having side walls provided forwardly of the bar with a lifting member and rearwardly of the bar having relatively spaced rearwardly extending portions, a pin transversely carried by said rearwardly extending portions spaced rearwardly of the rear wall of the bar, a solid synthetic resin anti-friction member mounted on said pin having grooved sockets slidably receiving the projecting trackways of the bar therein, and a pawl type lifting means carried by said side walls of the casing at the rear of the bar in position to engage the teeth of the bar to raise and lower the casing on said bar.

6. In a vehicle lifting jack the combination of a supporting base, an elongated rack bar having a series of teeth extending therealong, a lifting assemblage slidably mounted on said bar including a casing provided with side walls engaging at opposite sides of the bar having a front lift extension, said side walls additionally extending forwardly in spaced relation in front of said bar, a cross pin supported on said additional forward extensions in spaced relation from and at the front of said bar, a rigid metal clip pivotally mounted on said pin, a solid synthetic resin anti-friction member mounted on said clip and engaging the front wall of said bar, a pawl type lifting means carried by said casing walls at the rear of the bar in position to engage the teeth of the bar to raise and lower the casing on said bar, said clip being of U-shaped formation, including leg portions and a bight portion, said leg portions having an aperture to receive the pin and the bight portion being apertured, said synthetic resin anti-friction member being mounted in the aperture of the bight portion of the clip and projecting rearwardly therefrom and having a recessed outer face engaging the front of said rack bar.

References Cited by the Examiner
UNITED STATES PATENTS

| | | | |
|---|---|---|---|
| 682,601 | 9/01 | Campbell | 254—111 |
| 988,106 | 3/11 | Johnston | 29—159.2 |
| 1,448,803 | 3/23 | Huntington et al. | 29—159.2 |
| 1,526,152 | 2/25 | Kinney | 254—109 |
| 2,041,376 | 5/36 | Schmidt | 74—575 |
| 2,249,050 | 7/41 | Schmidt | 254—111 |
| 2,450,596 | 10/48 | Kais | 254—111 |
| 2,463,771 | 3/49 | Hunz | 74—575 |
| 2,487,553 | 11/49 | Hunz | 74—575 |

FOREIGN PATENTS 879,360   10/61   Great Britain.

WILLIAM FELDMAN, Primary Examiner.
HARRISON R. MOSELEY, Examiner.